ns P 3,741,621
McCrobie June 26, 1973

[54] ADD LENS PROJECTION SYSTEM WITH BALANCED PERFORMANCE

[75] Inventor: George L. McCrobie, Rochester, N.Y.

[73] Assignee: Xerox Corporation, Stamford, Conn.

[22] Filed: Apr. 1, 1971

[21] Appl. No.: 130,134

[52] U.S. Cl.................................. 350/183, 350/38
[51] Int. Cl......................... G02b 15/10, G02b 7/04
[58] Field of Search...................... 350/38, 183, 220

[56] References Cited
UNITED STATES PATENTS

| 3,609,013 | 9/1971 | Kawazu | 350/220 |
| 3,600,066 | 8/1971 | DelVecchio | 350/183 |
| 3,591,256 | 7/1971 | Hoyer et al. | 350/183 |
| 2,985,070 | 5/1961 | Lane | 350/183 |

FOREIGN PATENTS OR APPLICATIONS

| 358,734 | 12/1921 | Germany | 350/38 |

Primary Examiner—David Schonberg
Assistant Examiner—Paul A. Sacher
Attorney—James J. Ralabate, Albert A. Mahassel, Michael Shanahan and Michael J. Colitz

[57] ABSTRACT

An add lens projection system is designed such that substantially similar system performance is obtained with added and subtracted add lens elements at balanced positions on either side of a principal position at which the basic lens combination is designed. The basic lens combination may include a non-symmetrical split dagor lens or a non-symmetrical heliar lens plus singlet.

7 Claims, 4 Drawing Figures

ADD LENS PROJECTION SYSTEM WITH BALANCED PERFORMANCE

BACKGROUND OF THE INVENTION

This invention relates to heliar and split dagor lens systems and in particular to lens systems of the foregoing types to which extra lens elements are added and subtracted to maintain a fixed overall conjugate length and optical path while varying magnification.

Copying machines are often required to produce copies of an original document or other target that are either enlarged or reduced in size. For the sake of economy in machine design, the overall conjugate length and optical path are preferably fixed and the lens elements are manipulated to obtain the desired magnifications. An example of the foregoing type of optical system for a xerographic copying machine is disclosed in U.S. Pat. No. 3,476,478. In the optical system described in the patent, a main projection lens is moved along the optical axis and "add lens" elements are placed into the optical path at specified locations to yield the different magnifications and maintain the overall conjugate. The disclosure of that patent is incorporated by reference into the present description. One problem encountered with "add lens" projection systems is that the performance of the system falls off when lens elements are added or subtracted from the basic lens combination around which the system is initially designed. For example, in the referenced patent, the basic lens combination is designed for a 1:1 magnification at a principal position and is moved to different locations at increasing distances from the principal position to obtain the various magnifications. At the first removed or first add lens position, the resolution capability of the lens system is less than at the principal position and the aberrations are greater. This is a naturally expected result because the basic lens combination is tailor made for the principal position. The deterioration in lens performance is even greater when the basic lens combination is moved to second, third and additional add lens positions. Consequently, although the desired magnifications are obtained and the overall conjugate is held constant, the system may be unacceptable at several add lens positions because resolution falls off too much and/or the aberrations become too large.

The present lens system optimizes the performance of "add lens" systems by increasing the number of add lens positions, i.e., by increasing the number of magnifications available, without downgrading the lens performance at new add lens positions.

Accordingly, it is an object of this invention to overcome the above noted problems and limitations associated with "add lens" optical systems.

Another object of the present invention is to design an add lens system having a plurality of add lens positions but a minimum of system deterioration due to shifting between add lens positions.

Yet another object of the invention is to define novel add lens projection systems using heliar or split dagor lens combinations.

Another object of this invention is to balance the performance of an add lens system at various add lens positions.

Even a further object of this invention is to select, as between heliar and split dagor types, a basic lens combination for an add lens optical system.

These and other objects of this invention are realized by designing an add lens projection of system such that substantially similar system performance is obtained at two add lens positions. These equal performance positions are on opposite sides of the principal position meaning that magnification is increased at one add lens position and reduced at the other, relative to the magnification at the principal position. Quite often a 1:1 magnification is desired and in the past this magnification was assigned to the principal position. One reason for this is to utilize symmetrical dagor, heliar, gauss, celor and other lens systems which are substantially aberration free at the 1:1 magnification. However, in this invention, the 1:1 magnification is assigned to an add lens position.

The present invention has application for systems requiring two or more magnifications. In a two magnification system, the principal position is not used but only the less efficient first and second add lens positions. This is still advantageous because the performance of the lens system at the two add lens positions is balanced whereas it would be unbalanced if, for example, the principal position and only one add lens position were used. In a three magnification system, the principal and flanking first and second add lens positions are all used. In a four magnification system, the principal position is not used and third and fourth add lens positions are created at further but balanced positions from the principal position. In a five magnification system the principal position is used along with the other positions of the four magnification system. Greater even and odd numbers of magnification are possible by creating more balanced add lens positions and by using or not using the principal position. Also, an add lens position on one side of the principal position can be balanced with two or more add lens positions on the other side. In this case, the multiple add lens positions are sufficiently close together, in terms of system performance, such that any one of them yield substantially similar system performance when compared to their balanced add lens position on the opposite side.

The advantage gained by the present system is significant over a system that simply moves the basic lens combination further and further away from the principal position without "balancing." In a five magnification system using the present scheme, only two drops in system performance are encountered for the four positions added to the principal position. In prior art add lens systems, four drops in system performance would result with four new lens positions. Clearly, a system might succeed with only two deteriorating requests in performance made on its where it would fail under four deteriorating requests.

DESCRIPTION OF THE DRAWINGS

Other objects and features of the present invention will be apparent from a further reading of the present specification and from the drawings which are.

DESCRIPTION OF THE EMBODIMENTS

The following discussion is limited to lens system design and the reader is referred to the disclosure of U.S. Pat. No. 3,476,478 for a specific application. That patent also discloses apparatus for mounting the basic lens combination and add lens, for moving the basic lens combination along the optical path and for inserting and withdrawing an add lens. Naturally, the present add lens system will find application in that and other xerographic copying machines as well as in other non-xerographic machines such as those using silver halide photography as the recording medium. Furthermore, the dagor and heliar add lens systems of FIGS. 1 & 2 are designed for specific magnifications of about 1:1, 0.643X and 0.495X but quite clearly other magnifications can be employed included those greater than 1:1.

Figure 1:
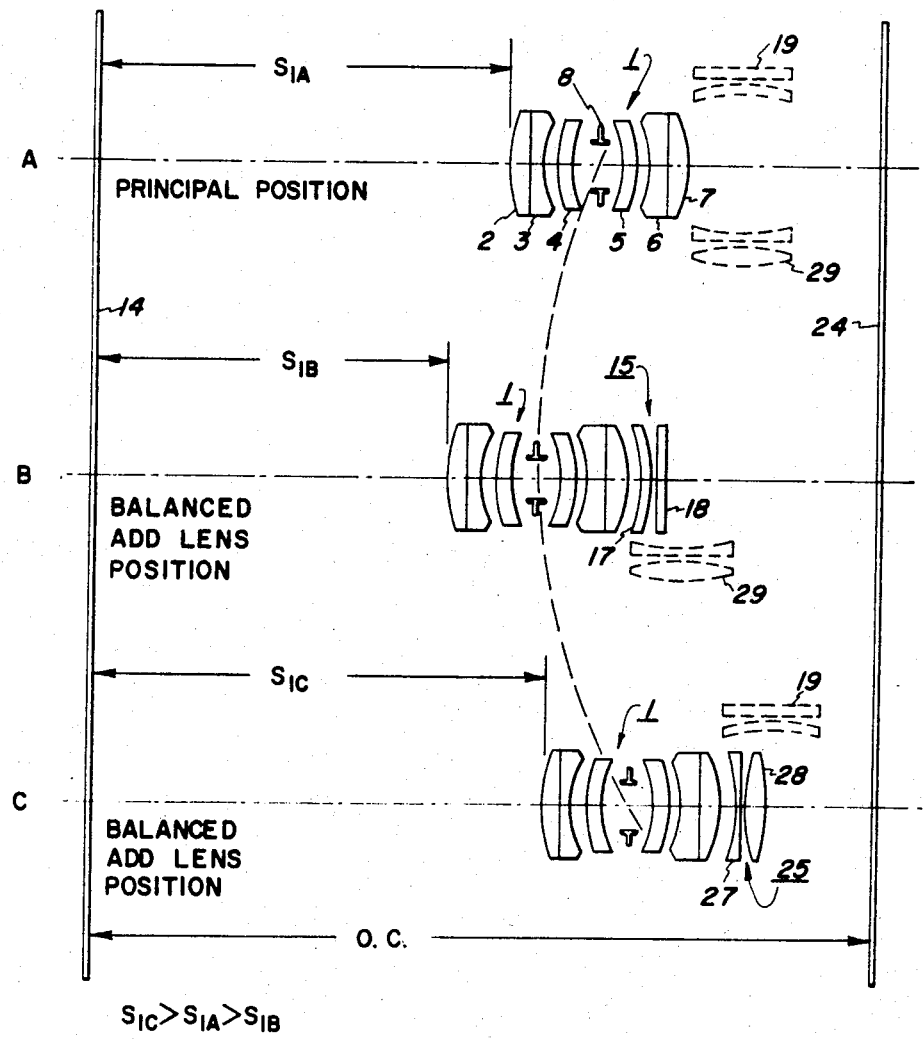
FIG. 1 is a schematic of a lens system according to the present invention employing a split dagor basic lens combination located at the principal position in part A and at balanced add lens positions in parts B and C.
Figure 2:
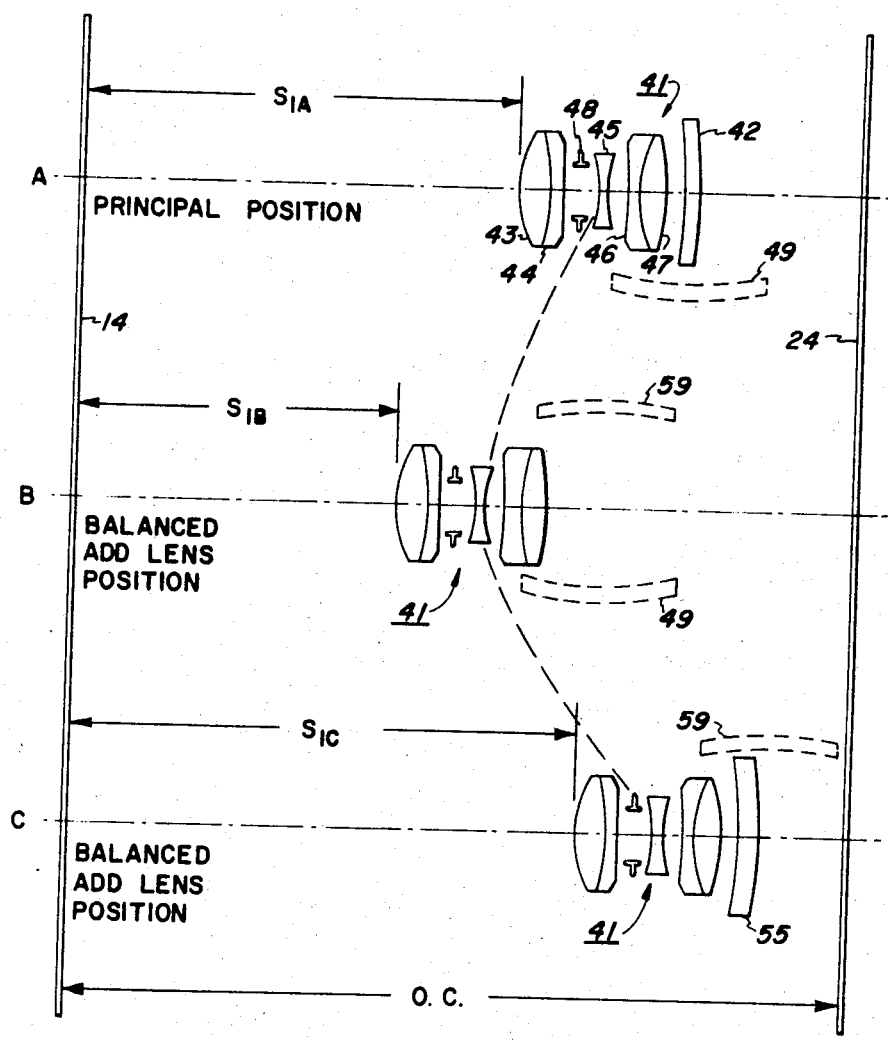
FIG. 2 is a schematic of a lens system according to the present invention employing a heliar plus singlet basic lens combination located at the principal position in part A and at balanced add lens positions in parts B and C.
Figure 3:
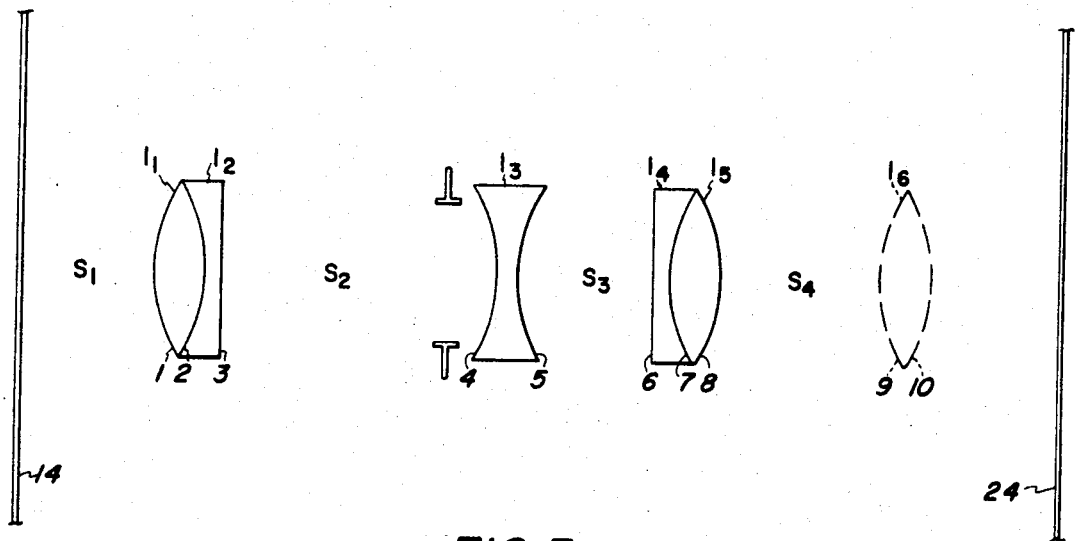
FIG. 3 is an enlarged schematic of the heliar system including identification of various system parameters.
Figure 4:
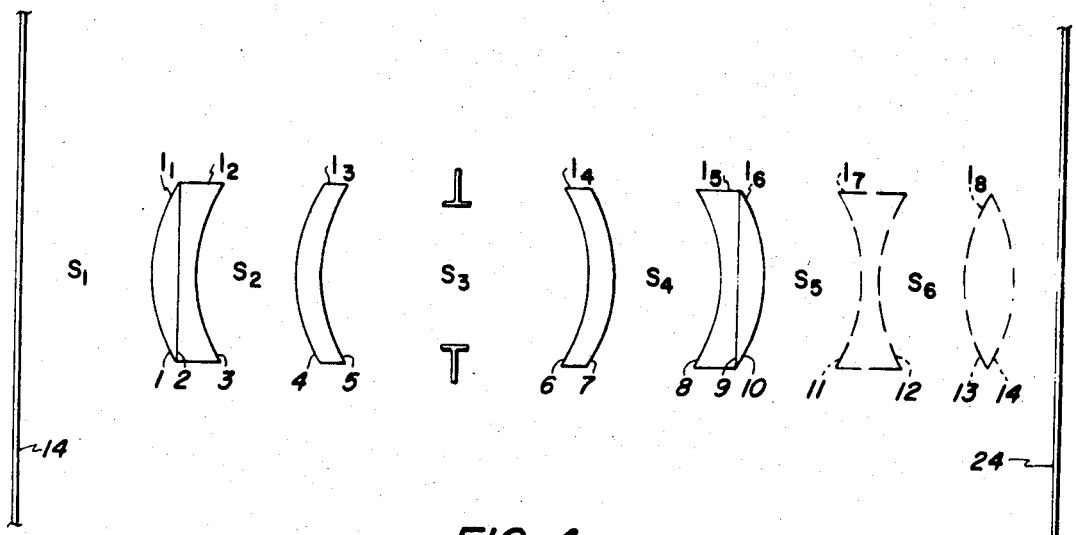
FIG. 4 is an enlarged schematic of the split dagor system including identification of various system parameters.

Turning now to FIG. 1, the basic lens combination for this add lens system is the non-symmetrical split dagor lens 1 comprising the six lens elements 2–7 and centrally located aperture 8. The glass type, refractive index, curvature and spacing parameters for the dagor lens 1 are tailor made for about a 0.643X magnification at the principal position shown in part A of FIG. 1. The system is designed using the "GREY" program developed by David Grey associates, "ACCOS" developed by Gordon Spencer of Scientific Calculations, Inc. and the "SCIP" program developed at Scientific Calculations. Analysis was done on UNIVAC 1108 and IBM 1130 Computers using the Scientific Calculations, Inc. "GOALS" and "SCIP" programs.

The design of the dagor lens at the 0.643X magnification is a departure from conventional practice. Conventional practice teaches that the basic dagor should be designed at the 1:1 magnification because the elements left and right of the aperture are symmetrical. The symmetry is economically desirable for production purposes and is qualitatively desirable because coma and spherical and lateral aberrations are at a minimum. However, the non-symmetrical dagor is selected in this invention so that the principal position can be located between two add lens positions to "balance" system performance.

In part B of FIG. 1, the basic lens combination 1 is moved to the first add lens position which is closer to the object plane 14 than the principal position thereby yielding an increase in magnification. The magnification at this position is about 1:1. The doublet add lens 15 is aligned to the optical axis 16 at a fixed spacing from dagor lens element 7. The doublet includes the lens elements 17 and 18 which are selected to hold the overall conjugate and to correct lateral color in the lens system with the basic lens combination at this position. The dashed lines 29 indicate the withdrawn position of the doublet add lens 25.

In part C of FIG. 1, the basic lens combination 1 is moved to the second add lens position which is closer to the image plane 24 than the principal position thereby yielding a reduction in magnification. The magnification at the second add lens position is about 0.495X. The doublet add lens 15 is removed and the doublet add lens 25 is inserted in its place in alignment with the dagor lens 1 along the optical axes at a fixed spacing from dagor lens element 7. The doublet 25 includes the lens elements 27 and 28 which are selected to correct lateral color in the lens system at this second add lens position. (The dashed lines 19 represent doublet 15 when it is at a withdrawn position.) The lens system at the principal position exhibits negligible lateral color because the dagor is tailor made for that position.

The doublet add lenses 15 and 25 are designed such that the lens system performs substantially the same at the first and second add lens positions. This is what is meant when the system is said to be "balanced" at the two add lens positions. The balancing is accomplished by matching lens system parameters such as depth of focus, resolution, and aberrations at the two add lens positions. The matching is possible because in one case the basic lens combination is moved toward the object and in the other it is moved toward the image. The fall off in lens system performance decreases from the same starting point as the basic lens is moved in the opposite directions. If the basic lens combination is moved to a first add lens position toward the object (or image) and then to a second add lens position in the same direction, the decrease in lens system performance falls off from a lower standard with the second move thereby insuring that the lens system performance will be unbalanced at the two add lens positions.

The foregoing discussion should not be interpreted to mean that balance is obtained by simply selecting add lens positions on opposite sides of the principal position. The spacing between add lens and basic lens, refractive index, glass type and curvature must be specifically selected to obtain the balance. In fact, the add lenses are generally not similar because, for one, the basic lens element is not symmetrical. Consequently, to practice the present invention one must be aware of the desired end result of balanced lens performance in addition to selecting add lens positions on either side of the principal position.

Turning now to FIG. 2, the basic lens combination for this add lens system is the non-symmetrical heliar 41 plus the singlet 42. The heliar includes the five lens elements 43–47 and aperture 48. The glass type, refractive index, curvature and spacing parameters for the heliar lens 41 plus singlet 42 are tailor made for the 0.643X magnification at the principal position shown in part A OF FIG. 2. The design and analysis employed include the same computer programs and computers as with the split dagor add lens system.

Again, the design of the heliar plus singlet lens at 0.643X magnification is a departure from conventional practice. As with the split dagor lens, conventional practice teaches that the basic lens combination should be designed at the 1:1 magnification because the heliar is symmetrical at that magnification. The symmetry yields the economic and quality features mentioned earlier in regard to the dagor lens.

One difference between the present heliar and split dagor add lens systems is that basically one less lens element is used in the heliar system. This "one less" distinction assumes that other split dagor systems are possible where singlet rather than doublet add lenses are used, such as where lateral color aberrations are not important to system design. Of course, the basic lens combination may alternately include a triplet, celor, full gauss, inverted gauss or other lens system. Another difference between the present two add lens systems is that the heliar lens combination includes an additional lens element, i.e., the singlet 42, whereas in the split dagor system the dagor lens itself comprises the basic lens combination. This latter distinction points out that the embodiment of FIG. 2 is even further removed from conventional lens designs than the embodiment of FIG. 1. In fact, the heliar lens system of FIG. 2 exhibits superior performance with greater economy than the split dagor of FIG. 1.

In part B of FIG. 2 the basic lens combination 41 is moved to the first add lens position which is closer to the object plane 14 than the principal position thereby yielding an increased magnification. The magnification at this position is about 1:1 and is obtained by the new spacing and by removing the singlet 42 from the optical path. (The fact that a lens is subtracted from the basic lens combination at one of the add lens position is also novel to add lens systems.) The dashed lines 49 represent the withdrawn position of singlet 42.

In part C of FIG. 2, the basic lens combination 41 (minus singlet 42) is moved to the second add lens position which is closer to the image plane 24 than the principal position thereby yielding a reduction in magnification. The magnification at this position is 0.495X and is obtained by the new location and by the substitution of singlet 55 for singlet 42. Singlet 55 is aligned to the optical axis 16 and positioned at a specified distance from heliar element 47 substantially equal to that for singlet 42. Dashed lines 49 and 59 represent the withdrawn positions of the singlets 55 and 42, respectively.

The heliar add lens system shows little lateral color aberration at the principal position since it is tailor made for that location. Unlike the split dagor system, however, the lateral color occurring at the first and second (1x and 0.495x) add lens positions does not require a doublet.

Another highly attractive feature of the heliar plus singlet system is that one of the heliar elements 44 has a zero curvature meaning it is economical to manufacture. Also, the heliar plus singlet system has a greater depth of focus than the system of FIG. 1 which is highly relevant to production because of the wider mechanical tolerance that is permitted.

The primary feature of the heliar system is still the same as that of the split dagor system; namely, balanced lens system performance at the first, second and other add lens positions. The balanced performance is obtained here as with the split dagor system by moving the basic lens combination left and right of the principal position. The distances actually moved and the parameters of the add lens added or subtracted depend upon the magnification sought at the two add positions and the degree of fall off in performance that is tolerable.

The following data defines the heliar plus singlet and split dagor add lens systems of FIGS. 1 and 2 and FIGS. 3 and 4 are enlarged schematics of the systems which help define the various parameters: These parameters include:

The lens element closest to the object plane 14 is designated $l_1$ and all lens elements encountered proceeding toward the image plane 24 are labeled similarly but with increasing numerical subscripts.

The air space between the object plane and lens element $l_1$ is designated $S_1$ and all air spaces encountered proceeding toward the image plane are labeled similarly but with increasing numerical subscripts.

The surface of lens element $l_1$ closer to the object plane is labeled 1 and all other lens element surfaces are labeled with increasing numbers proceeding toward the image plane.

The thickness of a lens element is given by the letter $t$ with the appropriate subscript. For example, the thickness of lens $l_3$ is $t_3$.

The parameter $n_d$ is the refractive index of the glass for the sodium line. The parameter $v$ is the $v$ or Abbe number used with $n_d$ to identify a glass on a glass chart. The alphanumeric notations represent the glass designations of the Schott Glass Company of Duryea, Pa.

All dimensions are given in inches.

The focal length of the heliar plus singlet at the principal position is $f = 13.5$ with $f/5.6$. (Overall conjugate = 54.33.)

FIXED PARAMETERS

| | |
|---|---|
| $S_2 = 0.5088$ | $R_6 = -20.4682$ |
| $S_3 = 0.7605$ | $R_7 = 4.3974$ |
| $S_4 = 1.0000$ | $R_8 = -5.4296$ |
| $R_1 = 4.1939$ | $t_1 = 0.7075$ |
| $R_2 = -4.6494$ | $t_2 = 0.3684$ |
| $R_3 = \infty$ | $t_3 = 0.1950$ |
| $R_4 = -5.4119$ | $t_4 = 0.4745$ |
| $R_5 = 3.8424$ | $t_5 = 0.8519$ |
| | $t_6 = 0.5000$ |
| $l_1$ = SK16  $n_d = 1.62041$ | $v = 60.3$ |
| $l_2$ = KF5   $n_d = 1.52310$ | $v = 50.9$ |
| $l_3$ = KF5   $n_d = 1.52310$ | $v = 50.9$ |
| $l_4$ = KF5   $n_d = 1.52310$ | $v = 50.9$ |
| $l_5$ = SK16  $n_d = 1.62041$ | $v = 60.3$ |
| $l_6$ = K5    $n_d = 1.52249$ | $v = 59.6$ |
| SK16 (620603) | Dense Barium Crown |
| KF5 (523509) | Crown Flint |
| K5 (522596) | Crown |

VARIABLE PARAMETERS

| Magnification | $S_1$ | $R_9$ | $R_{10}$ | $f$ |
|---|---|---|---|---|
| .990× | 25.233 | | | 13.5002 |
| .643× | 31.142 | −21.3083 | −17.4095 | 12.8607 |
| .495× | 34.165 | −19.2382 | −12.9619 | 11.9766 |

The focal length of the split dagor at the principal position is $f = 13.01$ with $f/5.6$ (Overall conjugate = 54.33.)

FIXED PARAMETERS

| | |
|---|---|
| $S_2 = 0.2596$ | $R_8 = -2.4721$ |
| $S_3 = 1.4056$ | $R_9 = \infty$ |
| $S_4 = 0.2121$ | $R_{10} = -3.3748$ |
| $R_1 = 3.4758$ | $t_1 = 1.1718$ |
| $R_2 = \infty$ | $t_2 = 0.5176$ |
| $R_3 = 2.4128$ | $t_3 = 0.3390$ |
| $R_4 = 3.5644$ | $t_4 = 0.3481$ |
| $R_5 = 5.4504$ | $t_5 = 0.7374$ |
| $R_6 = -6.7029$ | $t_6 = 0.7891$ |
| $R_7 = -3.9639$ | |
| $l_1$ = SKN18  $n_d = 1.63854$ | $v = 55.42$ |
| $l_2$ = LF1    $n_d = 1.57309$ | $v = 42.58$ |
| $l_3$ = BAF9   $n_d = 1.64328$ | $v = 47.96$ |
| $l_4$ = BAF9   $n_d = 1.64328$ | $v = 47.96$ |
| $l_5$ = LF1    $n_d = 1.57309$ | $v = 42.58$ |
| $l_6$ = SKN18  $n_d = 1.63854$ | $v = 55.42$ |
| SKN18 (638554) | Dense Barium Crown |
| LF1 (573426) | Light Flint |
| BAF9 (643480) | Barium Flint |

VARIABLE PARAMETERS

| Magnification | $S_1$ | $S_3$ | $S_5$ | $f$ |
|---|---|---|---|---|
| 1× | 24.096 | 0.650 | 0.100 | 13.58 |
| .643× | 30.174 | | | 13.01 |
| .495× | 32.900 | 0.500 | 0.020 | 12.07 |
| | $R_{11}$ | $R_{12}$ | $R_{13}$ | $R_{14}$ |
| 1× | −16.2602 | −21.1026 | $\infty$ | −98.0392 |
| .643× | | | | |
| .495× | −53.9084 | $\infty$ | 76.9321 | −37.0370 |
| $l_7$ = F4 | $n_d = 1.61659$  $v = 36.63$ | $t_7$ at 1× = 0.44 | | |
| $l_8$ = K7 | $n_d = 1.51112$  $v = 60.41$ | $t_7$ at .495× = 0.35 | | |
| F4 | (617366)  Flint | $t_8$ at 1× = 0.45 | | |

| K7 | (511604) Crown | $t_6$ at .495× = 0.40 |
|---|---|---|

While the invention has been described with reference to the structures disclosed herein, it is not confined to the details set forth. For example, the specific parameters given above to describe the heliar add lens system can vary within acceptable tolerances as is well understood. This application is intended to cover such modifications or changes as may come within the purposes or scope of the present invention.

What is claimed is:

1. A heliar plus singlet add lens system comprising lens elements and spacings having parameters including:

FIXED PARAMETERS $S_2=0.5088$  $R_6=-20.4682$
$S_3=0.7605$  $R_7=4.3974$
$S_4=1.0000$  $R_8=-5.4296$
$R_1=4.1939$  $t_1=0.7075$
$R_2=-4.6494$  $t_2=0.3684$
$R_3=\infty$  $t_3=0.1950$
$R_4=-5.4119$  $t_4=0.4745$
$R_5=3.8424$  $t_5=0.8519$
   $t_6=0.5000$
$l_1=nd=1.62401$  $v=60.3$
$l_2=nd=1.52310$  $v=50.9$
$l_3=nd=1.52310$  $v=50.9$
$l_4=nd=1.52310$  $v=50.9$
$l_5=nd=1.62041$  $v=60.3$
$l_6=nd=1.52249$  $v=59.6$

VARIABLE PARAMETERS

| Magnification | $S_1$ | $R_9$ | $R_{10}$ | $f$ |
|---|---|---|---|---|
| .990× | 25.233 | | | 13.5002 |
| .664× | 31.142 | −21.3083 | −17.4095 | 12.8607 |
| .495× | 34.165 | −19.2382 | −12.9619 | 11.9766 | wherein $l_1$ through $l_5$ define the lens elements of the heliar and $l_6$ defines the singlet with the subscripts identifying the position of the lens relative to an object plane, the parameters R define radii of the lens elements with the subscripts identifying the surfaces of the lens proceeding with subscript 1 identifying the lens surface closest to the object plane and the remaining subscripts identifying the lens surfaces displaced further from the object plane in ascending order, the parameters S define the spacings of the lens elements relative to each other and the object and image planes with $S_1$ also identifying principal and add lens positions, $S_1$ defines the spacing between the object plane and the surface having radius $R_1$, $S_2$, $S_3$, and $S_4$ define respectively the spacings between lens $l_2$ and $l_3$, the parameters $t$ define the thickness of a lens with the subscript corresponding to a lens, $l_3$ and $l_4$, and $l_5$ and $l_6$, the parameters $nd$ define the refractive index of the glass comprising a lens element for the sodium line and the parameters $v$ define the abbe number of a glass used with $nd$ to identify a glass on a glass chart.

2. A split dagor plus doublet add lens system comprising lens elements and spacing having parameters including:

FIXED PARAMETERS $S_2=0.2596$  $R_6=-2.4721$
$S_3=1.4056$  $R_9=\infty$
$S_4=0.2121$  $R_{10}=-3.3748$
$R_1=3.4758$
$t_1=1.1718$
$R_2=\infty$  $t_2=0.5176$
$R_3=2.4128$  $t_3=0.3390$
$R_4=3.5644$  $t_4=0.3481$
$R_5=5.4504$  $t_5=0.7374$
$R_6=-6.7029$  $t_6=0.7891$
$R_7=-3.9639$
$l_1=nd=1.63854$  $v=55.42$
$l_2=nd=1.57309$  $v=42.58$
$l_3=nd=1.64328$  $v=47.96$
$l_4=nd=1.64328$  $v=47.96$
$l_5=nd=1.57309$  $v=42.58$
$l_6=nd=1.63854$  $v=55.42$

VARIABLE PARAMETERS

| Magnification | $S_1$ | $S_3$ | $S_4$ | $f$ |
|---|---|---|---|---|
| 1× | 24.096 | 0.650 | 0.100 | 13.58 |
| .643× | 30.174 | | | 13.01 |
| .495× | 32.900 | 0.500 | 0.020 | 12.07 |
| | $R_{11}$ | $R_{12}$ | $R_{13}$ | $R_{14}$ |
| 1× | −16.2602 | −21.0526 | ∞ | −98.0392 |
| .643× | | | | |
| .495× | −53.9084 | ∞ | 76.9231 | −37.0370 |

$l_7=nd=1.61659$  $v=36.63$  $t_7$ at 1× = 0.44
$l_8=nd=1.51112$  $v=60.41$  $t_7$ at .495× = 0.35
   $t_8$ at 1× = 0.45
   $t_8$ at .495× = 0.40 wherein $l_1$ through $l_6$ define the lens elements of the dagor and $l_{7-8}$ define the doublet with the subscripts identifying the position of the lens relative to an object plane, the parameters R define radii of the lens elements with the subscripts identifying the surfaces of the lens proceeding with subscript 1 identifying the lens surface closest to the object plane and the remaining subscripts identifying the lens surfaces displaced further from the object plane in ascending order, the parameters S define the spacings of the lens elements relative to each other and the object and image planes with $S_1$ also identifying principal and add lens positions, $S_1$ defines the spacing between the object plane and the surface having radius $R_1$, $S_2$, $S_3$, $S_4$, $S_5$ and $S_6$ define the spacings respectively between lens elements $l_2$ and $l_3$, $l_3$ and $l_4$, $l_4$ and $l_5$, $l_6$ and $l_7$, and $l_7$ and $l_8$, define respectively the spacings between lens $l_2$ and $l_3$, the parameters $t$ define the thickness of a lens with the subscript corresponding to a lens, $l_3$ and $l_4$, and $l_5$ and $l_6$, the parameters $nd$ define the refractive index of the glass comprising a lens element for the sodium line and the parameters $v$ define the abbe number of a glass used with $nd$ to identify a glass on a glass chart.

3. A lens system for a copying apparatus providing multiple magnifications and being disposed along an optical path between fixed object and image planes in which respectively an original to be copied and a recording medium are located, said lens system including:

a basic lens group disposed for movement along said optical path between extreme positions and having an intermediate position therebetween in which said basic lens group is in focus relative to said object and image planes at an intermediate magnification, add lens elements for adding to said basic lens group, said add lens elements being movable into and out of said optical path for selective combination with said basic lens group, at least one of said add lens elements combining in a first combination with said basic lens group when the same is at a position toward said object plane relative to said intermediate position, said first combination being in focus relative to said object and image planes at a first magnification greater than said intermediate magnification, at least one of said add lens elements combining in a second combination with said basic lens group when the same is at a position toward said image plane relative to said intermediate position, said second combination being in focus relative to said object and image planes at a second magnification smaller than said intermediate magnification.

4. The system of claim 3 wherein said basic lens group includes a split Dagor lens.

5. The system of claim 3 wherein said add lens elements include lens doublets for inclusion with said basic lens group when located at balanced add lens positions.

6. A lens system for a copying apparatus providing multiple magnifications and being disposed along an optical path between fixed object and image planes in which respectively an original to be copied and a recording medium are located, said lens system including:

a basic lens group disposed for movement along said optical path between extreme positions and having an intermediate position therebetween, add lens elements for subtracting from or adding to said basic lens group, said add lens elements being movable into and out of said optical path for selective combination with said basic lens group, at least one of said add lens elements combining in an intermediate combination with said basic lens group when the same is at said intermediate position, said intermediate combination being in focus relative to said object and image planes at an intermediate magnification, said basic lens group being in focus relative to said object and image planes at a first magnification greater than said intermediate magnification when said basic lens group is at a position toward said object plane relative to said intermediate position, at least one of said add lens elements combining in a second combination with said basic lens group when the same is at a position toward said image plane relative to said intermediate position, said second combination being in focus relative to said object and image planes at a magnification smaller than said intermediate magnification.

7. The system of claim 6 wherein said basic lens group includes a non-symmetrical heliar lens.

* * * * *